US011475668B2

(12) United States Patent
Mukherjee et al.

(10) Patent No.: US 11,475,668 B2
(45) Date of Patent: Oct. 18, 2022

(54) SYSTEM AND METHOD FOR AUTOMATIC VIDEO CATEGORIZATION

(71) Applicant: BANK OF AMERICA CORPORATION, Charlotte, NC (US)

(72) Inventors: Maharaj Mukherjee, Poughkeepsie, NY (US); Utkarsh Raj, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 265 days.

(21) Appl. No.: 17/066,631

(22) Filed: Oct. 9, 2020

(65) Prior Publication Data

US 2022/0114368 A1   Apr. 14, 2022

(51) Int. Cl.
*G06V 20/40* (2022.01)
*G06F 16/783* (2019.01)
*G06F 16/71* (2019.01)
*G06V 10/82* (2022.01)

(52) U.S. Cl.
CPC .............. *G06V 20/41* (2022.01); *G06F 16/71* (2019.01); *G06F 16/7837* (2019.01); *G06V 10/82* (2022.01)

(58) Field of Classification Search
CPC ........ G06V 20/41; G06V 10/82; G06F 16/71; G06F 16/7837; G06F 16/75
USPC .......................................................... 382/103
See application file for complete search history.

(56) References Cited

U.S. PATENT DOCUMENTS

| | | |
|---|---|---|
| 6,892,193 B2 | 5/2005 | Bolle et al. |
| 6,928,407 B2 | 8/2005 | Ponceleon et al. |
| 6,993,535 B2 | 1/2006 | Bolle et al. |
| 7,853,600 B2 | 12/2010 | Herz et al. |
| 7,991,764 B2 | 8/2011 | Rathod |
| 8,135,221 B2 | 3/2012 | Jiang et al. |
| 8,311,344 B2 | 11/2012 | Dunlop et al. |
| 8,452,778 B1 | 5/2013 | Song et al. |
| 8,493,448 B2 | 7/2013 | Burazerovic |
| 8,533,134 B1 | 9/2013 | Zhao et al. |
| 8,719,865 B2 | 5/2014 | Moonka et al. |
| 8,818,028 B2 | 8/2014 | Nguyen et al. |
| 8,819,024 B1 | 8/2014 | Toderici et al. |
| 8,930,368 B2 | 1/2015 | Furuichi et al. |
| 9,020,263 B2 | 4/2015 | Dunlop et al. |
| 9,179,315 B2 | 11/2015 | Raleigh |
| 9,198,621 B2 | 12/2015 | Fernstrom et al. |

(Continued)

FOREIGN PATENT DOCUMENTS

| | | |
|---|---|---|
| CN | 105678293 A | 6/2016 |
| WO | WO2017151757 A1 | 9/2017 |

*Primary Examiner* — Amandeep Saini

(57) ABSTRACT

An apparatus includes a memory and processor. The memory stores a set of object categories and a set of motion categories. The processor splits a video into an ordered series of frames. For each frame, the processor determines that the frame includes an image of an object of a given object category. The processor assigns the given object category to the frame and stores the assigned object category in an ordered series of object category assignments. The processor determines, based on a subset of the ordered series of object category assignments, that the video used to generate the ordered series of object category assignments depicts a motion of a given motion category. The processor assigns the given motion category to the video.

20 Claims, 3 Drawing Sheets

(56) References Cited

U.S. PATENT DOCUMENTS

| | | |
|---|---|---|
| 9,244,923 B2 | 1/2016 | Cooper et al. |
| 9,338,520 B2 | 5/2016 | Girouard et al. |
| 9,405,976 B2 | 8/2016 | Dunlop et al. |
| 9,449,229 B1 | 9/2016 | Laska et al. |
| 9,473,828 B2 | 10/2016 | Wang et al. |
| 9,489,580 B2 | 11/2016 | Laska et al. |
| 9,501,915 B1 | 11/2016 | Laska et al. |
| 9,734,169 B2 | 8/2017 | Redlich et al. |
| 9,830,709 B2 | 11/2017 | Li et al. |
| 9,836,853 B1 | 12/2017 | Medioni |
| 9,886,161 B2 | 2/2018 | Laska et al. |
| 10,386,999 B2 | 8/2019 | Burns et al. |
| 10,389,954 B2 | 8/2019 | Shin et al. |
| 10,417,499 B2 | 9/2019 | Katz et al. |
| 10,613,213 B2 | 4/2020 | Silverstein et al. |
| 2014/0347479 A1 | 11/2014 | Givon |
| 2014/0366068 A1 | 12/2014 | Burkitt et al. |
| 2017/0124096 A1* | 5/2017 | Hsi .................... G06V 20/47 |
| 2017/0201793 A1 | 7/2017 | Pereira et al. |
| 2017/0270681 A1 | 9/2017 | Kirmani et al. |
| 2018/0338159 A1 | 11/2018 | Kapoor et al. |
| 2019/0035241 A1 | 1/2019 | Laska et al. |
| 2019/0124346 A1 | 4/2019 | Ren et al. |
| 2019/0387202 A1 | 12/2019 | Kirmani et al. |
| 2021/0042530 A1* | 2/2021 | Kim .................... G06V 20/64 |

\* cited by examiner

SYSTEM AND METHOD FOR AUTOMATIC VIDEO CATEGORIZATION

TECHNICAL FIELD

The present disclosure relates generally to image and video analysis, and more particularly, to a system and method for automatic video categorization.

BACKGROUND

Many websites host videos. Often such videos are uploaded to the websites by users.

SUMMARY

Many websites host videos. These include dedicated video hosting websites as well as blogs and social media sites. Often videos include user-generated content and are uploaded to these websites by their users. Accurate categorization of these videos is important in order to properly index the videos and thereby allow users to easily search for specific video content. In order to categorize their videos, many video hosting websites rely on user-provided tags. These tags are descriptions, provided by the users who submitted the videos and/or users who viewed the videos, of the content of the videos. Unfortunately, the use of user-provided tags often does not lead to accurate video categorization. This may occur because, for example, the user-provided tags may not include detailed enough descriptions, the user-provided tags may include misinformation, and/or the user-provided tags may otherwise omit information that may be needed for accurate categorization.

This disclosure contemplates a video categorization tool designed to automatically categorize videos without relying on the presence of user-provided tags. The tool uses a hybrid neural network method to perform this categorization. Specifically, the tool first uses a convolutional neural network to categorize individual frames of a video into a set of object categories, and then applies a recurrent neural network to the frame categorizations to arrive at a video categorization. An embodiment of the tool is described below.

According to one embodiment, an apparatus includes a memory and a hardware processor communicatively coupled to the memory. The memory stores a set of object categories and a set of motion categories. Each object category of the set of object categories corresponds to at least one object. Each motion category of the set of motion categories corresponds to at least one motion. The hardware processor receives a video and splits the video into an ordered series of frames. Each frame of the ordered series of frames corresponds to a time of the frame within the video and is ordered within the ordered series of frames according to the time. In response to splitting the video into the ordered series of frames, for each frame of the ordered series of frames, the processor determines that the frame includes an image of an object of a given object category of the set of object categories. The processor also assigns the given object category to the frame. The processor additionally stores the assigned object category in an ordered series of object category assignments. The assigned object category is ordered within the ordered series of object category assignments according to the time of the frame within the video. The processor further determines, based on at least a subset of the ordered series of object category assignments, that the video used to generate the ordered series of object category assignments depicts a motion of a given motion category of the set of motion categories. The processor also assigns the given motion category to the video.

Certain embodiments provide one or more technical advantages. As an example, an embodiment automatically generates categorizations for videos, without any reliance on user-provided tags. As another example, an embodiment reduces processing resources associated with video searches, by automatically categorizing videos in a consistent and accurate manner, thereby reducing the amount of searching undertaken by users of a video hosting website, in order to obtain desired results. As another example, an embodiment reduces the processing time associated with the video categorization process, by using a convolutional neural network, which has been parallelized and implemented on a graphics processing unit, to categorize individual frames of the video. As another example, an embodiment obtains more accurate results than previous video categorization techniques by applying a recurrent neural network to a time-ordered series of categories assigned to individual frames of a video, thereby enabling accurate categorizations videos that depict time-dependent motions. As a further example, an embodiment applies a filter to a time-ordered series of categories assigned to individual frames of a video to remove redundant and/or potentially irrelevant frame categorizations from the series, prior to applying a recurrent neural network to the series to generate a video categorization. In this manner, the embodiment improves the decision-making ability of the recurrent neural network, by helping to ensure that earlier frame categorizations are given sufficient consideration by the recurrent neural network in its learning process.

The system described in the present disclosure may particularly be integrated into a practical application of a video categorization system for use by a video hosting website. In response to receiving a video, uploaded by a user, the video hosting website may use the video categorization system to automatically assign the video to one or more categories. The video hosting website may then use these assigned categories to index the video. In this manner, the video categorization system may enable the video hosting website to provide more accurate video search results than are possible when relying on user-provided tags alone.

Certain embodiments may include none, some, or all of the above technical advantages. One or more other technical advantages may be readily apparent to one skilled in the art form the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
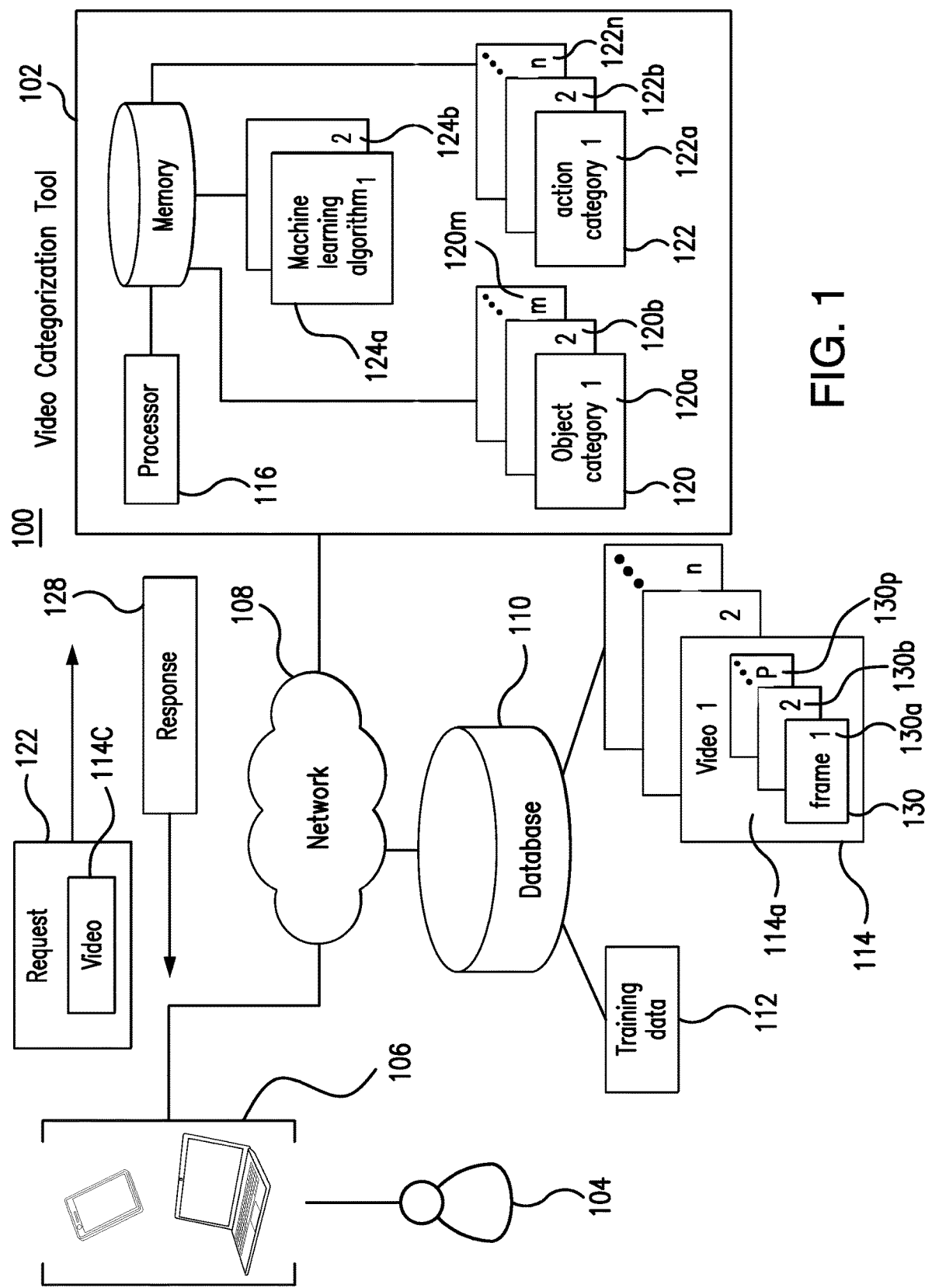
FIG. 1 illustrates an example video categorization system.
Figure 2:
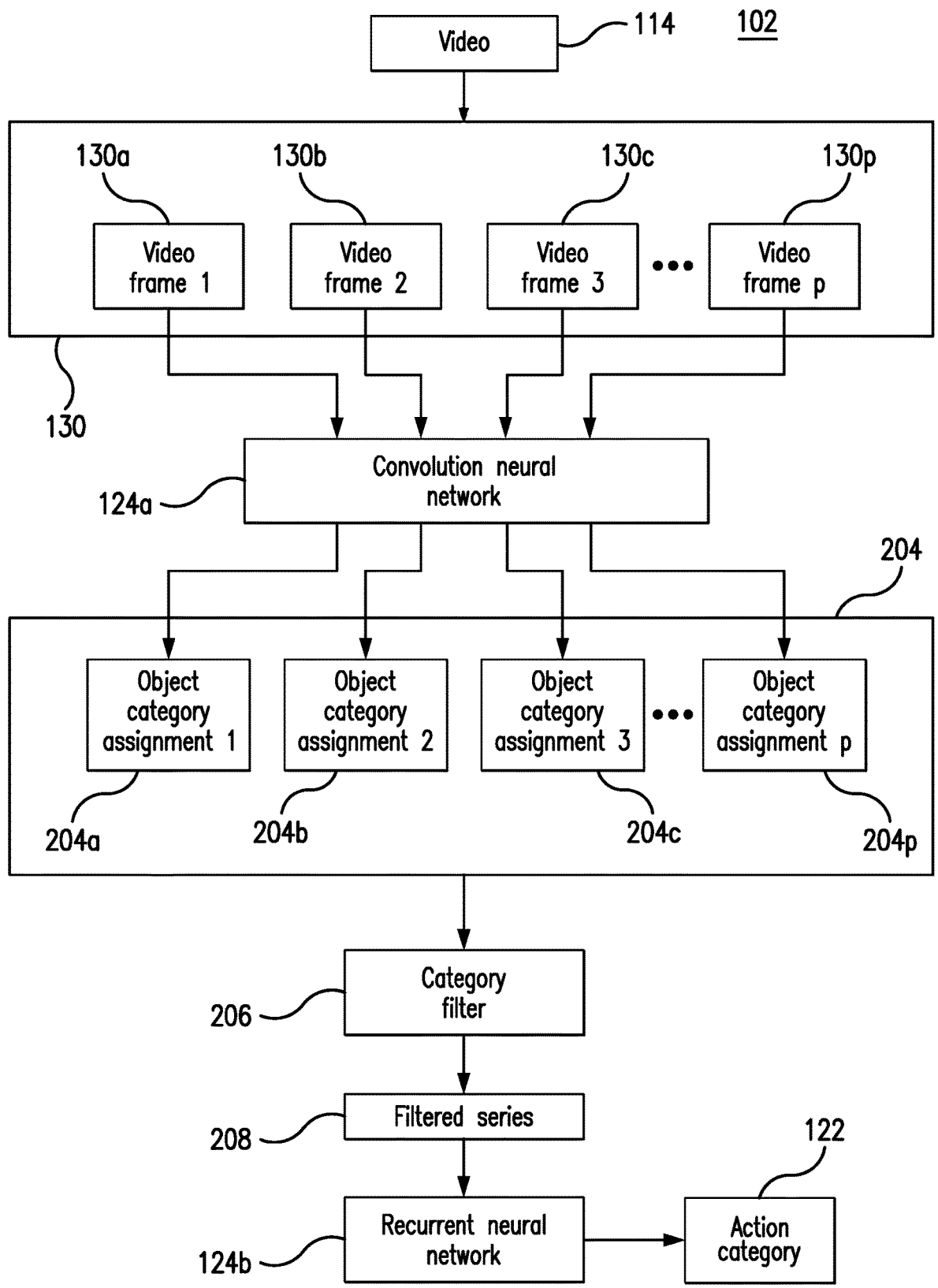
FIG. 2 illustrates an example of the process by which the video categorization tool of the system of FIG. 1 uses both a convolutional neural network and a recurrent neural network to categorize videos.
Figure 3:
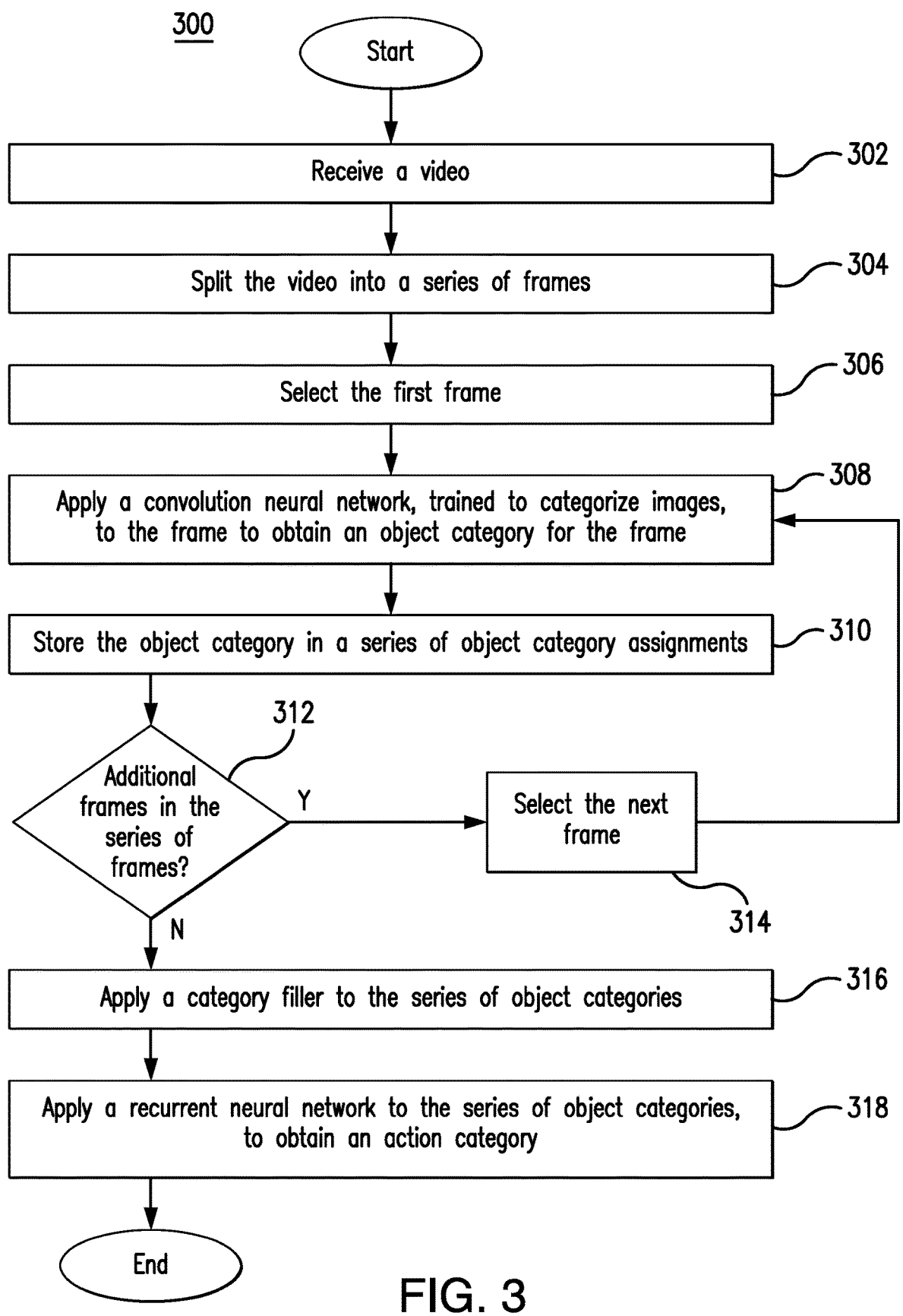
FIG. 3 presents a flowchart illustrating the process by which the video categorization tool of the system of FIG. 1 assigns a category to a video.

Embodiments of the present disclosure and its advantages may be understood by referring to FIGS. 1 through 3 of the drawings, like numerals being used for like and corresponding parts of the various drawings.

I. System Overview

FIG. 1 illustrates an example video categorization system 100 that includes video categorization tool 102, user(s) 104, device(s) 106, network 108, and database 110. Generally, video categorization tool 102 receives a video 114 and assigns the video to a motion category 122 of a set of motion categories 122a through 122n by: (1) splitting the video 114 into a series of frames 130, (2) assigning an object category 120 of a set of object categories 120a through 120m to each frame 130a through 130p of the series of frames 130, and (3) assigning the motion category 122 to the resulting series of object categories 120. The manner by which video categorization tool 102 performs such tasks will be described in further detail below, in the discussion of FIGS. 2 and 3.

Devices 106 are used by users 104 located on network 108 to communicate with video categorization tool 102. As an example, in certain embodiments, devices 106 are used by users 104 to transmit requests 126 to video categorization tool 102. For example, as illustrated in FIG. 1, in certain embodiments, device 106 is used by user 104 to transmit request 126 to video categorization tool 102, where request 126 includes video 114c and is a request to categorize video 114c. In certain embodiments, video categorization system 100 is part of a larger video hosting system, in which users 104 upload videos 114 so that the videos can be accessed and viewed on a website. In such embodiments, request 126 may be a request to upload video 114c to the website. In some embodiments, videos 114 may be stored in a database 110. In such embodiments, users 104 may use devices 106 to submit requests 126 to video categorization tool 102, requesting that video categorization tool 102 access a particular video 114c stored in database 110 and categorize the video. In such embodiments, request 126 may include information that is used by video categorization tool 102 to locate video 114c in database 110. For example, request 126 may include a file name associated with video 114c, an identification number assigned to video 114c, or any other suitable information.

As another example of the use of devices 106, in certain embodiments, devices 106 are used by users 104 to receive responses 128. Responses 128 include any information transmitted from video categorization tool 102 to devices 106. For example, in certain embodiments, response 128 includes the motion category 122b to which video categorization tool 102 has assigned a video 114c.

Devices 106 include any appropriate device for communicating with components of system 100 over network 108. For example, devices 106 may be a telephone, a mobile phone, a computer, a laptop, a wireless or cellular telephone, a tablet, a server, and IoT device, and/or an automated assistant, among others. This disclosure contemplates devices 106 being any appropriate device for sending and receiving communications over network 108. Device 106 may also include a user interface, such as a display, a microphone, keypad, or other appropriate terminal equipment usable by user 104. In some embodiments, an application executed by a processor of device 106 may perform the functions described herein.

Network 108 facilitates communication between and amongst the various components of system 100. This disclosure contemplates network 108 being any suitable network operable to facilitate communication between such components. Network 108 may include any interconnecting system capable of transmitting audio, video, signals, data, messages, or any combination of the preceding. Network 108 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Database 110 stores training data 112, and videos 114. Training data 112 includes any information that may be used to train first algorithm 124a and second algorithm 124b so that they can both be used, in conjunction with one another, to categorize a video 114 into a motion category 122 of a set of motion categories 122a through 122n. Specific examples of training data 112, and the manner by which video categorization tool 102 may use training data 112 to train first algorithm 124a and second algorithm 124b are described in further detail below, in the discussion of first algorithm 124a and second algorithm 124b.

Videos 114 may include videos that are to be categorized by video categorization tool 102 and/or videos that have previously been categorized by video categorization tool 102. For example, in certain embodiments, in response to receiving request 126, which includes a video 114c for categorization, video categorization tool 102 assigns video 114c to a motion category 122 of a set of motion categories 122a through 122n, and then stores video 114c, along with the motion category categorization, in database 110. As another example, in certain embodiments, in response to receiving request 126, which includes a video 114c for categorization, video categorization tool 102 first stores video 114c in database 110 and then assigns video 114c to a motion category 122 of the set of motion categories 122a through 122n. As a further example, in certain embodiments, video categorization tool 102 receives access to an external database 110, along with instructions 126 to categorize the videos 114a through 114n stored in the external database. Videos 114 may be black and white videos or color videos. Each video 114 includes a set of frames 130a through 130p. Each video 114 may include any number of frames 130. Each frame corresponds to a time, and includes a still image that is to be displayed at that corresponding time during playback of video 114. Each frame is formed from a set of pixels, each of which is associated with one or more values. For example, where video 114 is a black and white video, each pixel is associated with a single value from 0 to 255, where the value 0 corresponds to a completely black pixel and the value 255 corresponds to a completely white pixel. As another example, where video 114 is a color video, each pixel is associate with a set of three values—a red value, a green value, and a blue value.

As seen in FIG. 1, video classification tool 102 includes a processor 116 and a memory 118. This disclosure contemplates processor 116 and memory 118 being configured to perform any of the functions of video classification tool 102 described herein. Generally, video classification tool 102 (1) splits a video 114 into a set of frames 130, (2) uses first algorithm 124a to assign each of frames 130a through 130p to an object category 120 of the set of object categories 120a through 120m, (3) generates a time-ordered series of object category assignments from the assigned object categories 120, and (4) uses second algorithm 124b to assign the time-ordered series of object category assignments to a motion category 122 of a set of motion categories 122a through 122n. The manner by which video classification tool 102 performs these functions is described in further detail below, in the discussion of FIGS. 2 and 3.

Processor 116 is any electronic circuitry, including, but not limited to a central processing unit (CPU), a microprocessor, a graphics processing unit (GPU), a digital signal processor (DSP), an application specific integrated circuit (ASIC), an application specific instruction set processor (ASIP), and/or state machines, that communicatively couples to memory 118 and controls the operation of video classification tool 102. Processor 116 may be 8-bit, 16-bit, 32-bit, 64-bit or of any other suitable architecture. Processor 116 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 116 may include other hardware and software that operates to control and process information. Processor 116 executes software stored on memory to perform any of the functions described herein. Processor 116 controls the operation and administration of video classification tool 102 by processing information received from network 108, device(s) 106, database 110, and/or memory 118. Processor 116 may be a programmable logic device, a microcontroller, a microprocessor, any suitable processing device, or any suitable combination of the preceding. Processor 116 is not limited to a single processing device and may encompass multiple processing devices.

Memory 118 may store, either permanently or temporarily, data, operational software, or other information for processor 116. Memory 118 may include any one or a combination of volatile or non-volatile local or remote devices suitable for storing information. For example, memory 118 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 118, a disk, a CD, or a flash drive. In particular embodiments, the software may include an application executable by processor 116 to perform one or more of the functions described herein.

In certain embodiments, memory 118 also stores object categories 120*a* through 120*m*, motion categories 122*a* through 122*n*, and algorithms 124*a* and 124*b*. Each object category 120 of object categories 120*a* through 120*m* corresponds to at least one object of an image (for example, a frame 130). For example, an object category 120 may correspond to a car, a television, a basketball, a pizza, a swimming pool, a person and/or any other object that may be captured by and/or depicted in an image. Additionally, as used throughout this disclosure, an object of an image is not limited to a physical object appearing in the image, and can include anything captured by and/or depicted in the image. For example, the object of an image can be a scene captured by the image, such as an outdoor scene, an indoor scene, a landscape, a downtown of a city, or any other scene that can be captured by and/or depicted in an image. Each object category 120*a* through 120*m* may correspond to a single object or a collection of objects. As an example, an object category 120 may correspond to a basketball game and be associated with images that include a basketball and one or more basketball players. Memory 118 may store any number of object categories 120*a* through 120*m*. In certain embodiments, object categories 120*a* through 120*m* include broad categories 120. For example, object categories 120*a* through 120*m* may include broad categories such as the outdoors, the indoors, people, animals, etc. In some embodiments, object categories 120*a* through 120*m* include narrow categories 120. For example, object categories 120*a* through 120*m* may include narrow categories such as spruce tree, office desk, firefighter, elephant, etc. In certain embodiments, a descriptive label is assigned to each object category 120 of object categories 120*a* through 120*m*. The descriptive label for a given object category 120 may be anything that describes the contents of the images to be assigned to the given object category 120. In some embodiments, any type of label may be assigned to each object category 120 of object categories 120*a* through 120*m*. For example, object categories 120*a* through 120*m* may be assigned labels "1, 2, 3, . . . ," "A, B, C, . . . ," or any other suitable labels.

In certain embodiments, object categories 120*a* through 120*m* are specified by an external source. For example, in some embodiments, object categories 120*a* through 120*m* are specified by user 104. In certain embodiments, object categories 120*a* through 120*m* are identified by video categorization tool 102. For example, in some embodiments, object categories 120*a* through 120*m* are identified by first algorithm 124*a*. As a specific example, in certain embodiments, first algorithm 124*a* is an unsupervised convolutional neural network designed to group images into categories identified by the algorithm, based on common features identified in the images.

Each motion category 122 of motion categories 122*a* through 122*n* corresponds to at least one motion and/or activity depicted by a video 114. For example, a motion category 122 may correspond to a triathlon, a play, eating a pizza, birds flying, a conversation, and/or any other motion and/or activity depicted by a video 114. Additionally, as used throughout this disclosure, a motion and/or activity depicted by a video 114 is not limited to movement by a physical entity, and is simply meant to refer to anything that may be captured and/or depicted by a video 114. Each motion category 122*a* through 122*n* may correspond to a single motion and/or activity or a collection of motions and/or activities. As an example, a motion category 122 may correspond to a triathlon and be associated with videos 114 that depict swimming, cycling, and running. Memory 118 may store any number of motion categories 122*a* through 122*n*. In certain embodiments, motion categories 122*a* through 122*n* include broad categories 122. For example, motion categories 122*a* through 122*n* may include broad categories such as sports, personal interactions, animal activities, etc. In some embodiments, motion categories 122*a* through 122*n* include narrow categories 122. For example, motion categories 122*a* through 122*n* may include narrow categories such as soccer, hugging, dogs playing catch, etc. In certain embodiments, a descriptive label is assigned to each motion category 122 of motion categories 122*a* through 122*n*. The descriptive label for a given motion category 122 may be anything that describes the contents of the videos 114 to be assigned to the given motion category 122. In some embodiments, any type of label may be assigned to each motion category 122 of motion categories 122*a* through 122*n*. For example, motion categories 122*a* through 122*n* may be assigned labels "1, 2, 3, . . . ," "A, B, C, . . . ," or any other suitable labels.

In certain embodiments, motion categories 122*a* through 122*n* are specified by an external source. For example, in some embodiments, motion categories 122*a* through 122*n* are specified by user 104. In certain embodiments, motion categories 122*a* through 122*n* are identified by video categorization tool 102. For example, in some embodiments, motion categories 122*a* through 122*n* are identified by second algorithm 124*b*. As a specific example, in certain embodiments, second algorithm 124*b* is an unsupervised recurrent neural network designed to group videos 114 into categories identified by the algorithm, based on common features associated with the videos.

First algorithm 124*a* is an algorithm configured, when implemented by processor 116, to assign a frame 130 of a video 114 to a specific object category 120 of the set of object categories 120*a* through 120*m*. As input, first algorithm 124*a* takes frame 130. In certain embodiments, first algorithm 124*a* operates on the pixels of frame 130. As an example, in embodiments where frame 130 depicts a black and white image, first algorithm 124*a* may operate on a two-dimensional array, where each element of the array corresponds to a pixel of frame 130 and is assigned a value from 0 to 255 (0 corresponding to a completely black pixel and 255 corresponding to a completely white pixel). As another example, in embodiments where frame 130 depicts a color image, first algorithm 124*a* may operate on a three-dimensional array with a blue layer, a green layer, and a red layer. First algorithm 124*a* assigns a frame 130 of a video 114 to a specific object category 120 by determining that the frame 130 depicts an image of an object belonging to the specific object category 120. First algorithm 124*a* may determine that frame 130 depicts an image of an object belonging to the specific object category 120 in any suitable manner. For example, in certain embodiments, for each object category 120*a* through 120*m*, first algorithm 124*a* determines a probability that frame 130 depicts an object that belongs to the object category. First algorithm 124*a* then assigns frame 130 to the object category 120 associated with the largest determined probability. For example, consider a situation in which first algorithm 124*a* is configured to assign a frame 130 to one of three object categories—first object category 120*a*, second object category 120*b*, or third object category 120*c*. In response to determining that there is a 5% chance that frame 130 belongs to first object category 120*a*, a 1% chance that frame 130 belongs to second object category 120*b*, and a 95% chance that frame 130 belongs to third object category 120*c*, first algorithm 124*a* assigns frame 130 to third object category 120*c*. As output, first algorithm 124*a* provides the object category assignment (e.g., the name of the object category 120 to which first algorithm 124*a* assigned frame 130).

First algorithm 124*a* may be any algorithm capable of assigning a frame 130 to an object category 120 of a set of object categories 120*a* through 120*m*. For example, in certain embodiments, first algorithm 124*a* is a neural network. As a specific example, in certain embodiments, first algorithm 124*a* is a convolutional neural network (CNN). CNN 124*a* includes an input layer, an output layer, and one or more hidden layers. The hidden layers include at least one convolution layer. For example, CNN 124*a* may include the following sequence of layers: input layer, convolution layer, pooling layer, convolution layer, pooling layer, one or more fully connected layers, output layer. Each convolution layer of CNN 124*a* uses a set of convolution kernels to extract features from the pixels that form frame 130. In certain embodiments, the convolution layers of CNN 124*a* are implemented in the frequency domain, and the convolution process is accomplished using discrete Fourier transforms. This may be desirable to reduce the computational time associated with training and using CNN 124*a* for image classification purposes. For example, by converting to the frequency domain, the fast Fourier transform algorithm (FFT) may be implemented to perform the discrete Fourier transforms associated with the convolutions. Not only does the use of the FFT algorithm alone greatly reduce computational times when implemented on a single CPU (as compared with applying convolution kernels in the spatial domain), the FFT algorithm may be parallelized using one or more graphics processing units (GPUs), thereby further reducing computational times. Converting to the frequency domain may also be desirable to help ensure that CNN 124*a* is translation and rotation invariant (e.g., the assignment made by CNN 124*a* of a frame 130 to an object category 120, based on the presence of an object in frame 130, should not depend on the position and/or orientation of the object within frame 130).

In certain embodiments, first algorithm 124*a* is a supervised learning algorithm. Accordingly, in certain embodiments, video categorization tool 102 is configured to train first algorithm 124*a* to assign each of frames 130*a* through 130*p* to any of a set of predetermined object categories 120*a* through 120*m*. Video categorization tool 102 may train first algorithm 124*a* in any suitable manner. For example, in certain embodiments, video categorization tool 102 trains first algorithm 124*a* by providing first algorithm 124*a* with training data 112 that includes a set of labels attached to existing frames 130, where each label that is attached to a frame 130 indicates the object category 120 to which the frame belongs. In some embodiments, first algorithm 124*a* is an unsupervised learning algorithm. In such embodiments, video categorization tool 102 is configured to train first algorithm 124*a* by providing first algorithm 124*a* with a collection of frames 130 and instructing first algorithm 124*a* to group these frames 130 into object categories 120 identified by the algorithm, based on common features extracted from the frames.

In certain embodiments, first algorithm 124*a* is a single algorithm. In some embodiments, first algorithm 124*a* represents a collection of algorithms. For example, first algorithm 124*a* may represent a collection of algorithms that includes an algorithm configured to categorize images of animals, an algorithm configured to categorize images of plants, an algorithm configured to categorize images of sports games, and/or an algorithm configured to categorize images belonging to any other larger category. In certain embodiments, while corresponding to a single algorithm, first algorithm 124*a* may have been formed by assembling multiple algorithms, each configured to categorize images into subcategories of a broader category, into a single algorithm 124*a*. In some embodiments, first algorithm 124*a* may represent a collection of algorithms that includes an algorithm configured to categorize images into a set of broad categories, as well as one or more algorithms associated with each broad category and configured to categorize images into subcategories of the broad category.

Second algorithm 124*b* is an algorithm configured, when implemented by processor 116, to assign a video 114 to a specific motion category 122 of the set of motion categories 122*a* through 122*n*, using a time-ordered series of object category assignments. Each object category assignment corresponds to the assignment of a frame 130 of video 114 to an object category 120 of the set of object categories 120*a* through 120*m*. Each object category assignment is time-ordered within the series of object category assignments according to the time of the corresponding frame 130 within video 114, as described in further detail below, in the discussion of FIG. 2. Second algorithm 124*b* assigns a video 114 to a specific motion category 122 by determining, based on at least a subset of the time-ordered series of object category assignments, that video 114 depicts a motion of the specific motion category 122. Second algorithm 124b may determine that video 114 depicts a motion of the specific motion category 122 in any suitable manner. For example, in certain embodiments, for each motion category 122a through 122n, second algorithm 124b determines a probability that the series of object category assignments is associated with a video 114 which depicts a motion that belongs to the motion category. Second algorithm 124b then assigns video 114 to the motion category 122 associated with the largest determined probability. For example, consider a situation in which second algorithm 124b is configured to assign a video 114 to one of three motion categories—first motion category 122a, second motion category 122b, or third motion category 122c. In response to determining that there is a 5% chance that video 114 belongs to first motion category 122a, a 98% chance that video 114 belongs to second motion category 122b, and a 2% chance that video 114 belongs to third motion category 122c, second algorithm 124b assigns video 114 to second motion category 122b. As output, second algorithm 124b provides the motion category assignment (e.g., the name of the motion category 122 to which second algorithm 124b assigned video 114).

Second algorithm 124b may be any algorithm capable of assigning a video 114 to a motion category 122 of a set of motion categories 122a through 122n, based on a time-ordered series of object categories 120 assigned to individual frames 130 of the video. In certain embodiments, second algorithm 124b uses the position of each object category assignment within the series of object category assignments associated with video 114 to assign video 114 to a motion category 122. For example, the time-ordered series of object category assignments may include the following series of object categories 120: (swimmers, cyclists, runners). Based on the fact that "cyclists" follows "swimmers," but comes before "runners" in the series, second algorithm 124b may assign the video 114 associated with this series to a "triathlon" motion category 122. However, second algorithm 124b may not assign the following series: (cyclists, runners, swimmers) to this same motion category 122, due to the different time ordering of the assigned object categories 120.

In certain embodiments, second algorithm 124b is a neural network. As a specific example, in certain embodiments, second algorithm 124b is a recurrent neural network (RNN). RNN 124b includes an input layer, an output layer, and one or more hidden layers. Each hidden layer includes one or more feedback loops, in which output, generated from nodes of the hidden layer at a first step, is used as input to the nodes of the hidden layer at a second step. In this manner, RNN 124b may recurrently process a series of object category assignments, taking into account the specific order of the individual object categories 120 within the series, to assign the video 114 associated with the series to a motion category 124. Second algorithm 124b may be any recurrent neural network. For example, in certain embodiments, second algorithm 124b is a long short-term memory (LSTM) neural network.

In certain embodiments, second algorithm 124b is a supervised learning algorithm. Accordingly, in certain embodiments, video categorization tool 102 is configured to train second algorithm 124b to assign a series of object category assignments to any of a set of predetermined motion categories 122a through 122n. Video categorization tool 102 may train second algorithm 124b in any suitable manner. For example, in certain embodiments, video categorization tool 102 trains second algorithm 124b by providing second algorithm 124b with training data 112 that includes a set of labels attached to existing series of object category assignments, where each label that is attached to a series of object category assignments indicates the motion category 122 to which the series of object category assignments belongs. In some embodiments, second algorithm 124b is an unsupervised learning algorithm. In such embodiments, video categorization tool 102 is configured to train second algorithm 124b by providing second algorithm 124b with a collection of series of object category assignments and instructing second algorithm 124b to group the series in this collection into motion categories 122, identified by the algorithm, based on common features within the series.

In certain embodiments, second algorithm 124b is a single algorithm. In some embodiments, second algorithm 124b represents a collection of algorithms. For example, second algorithm 124b may represent a collection of algorithms that includes an algorithm configured to categorize videos depicting animals, an algorithm configured to categorize videos depicting sports games, an algorithm configured to categorize videos depicting weather events and/or an algorithm configured to categorize videos belonging to any other larger category. In certain embodiments, while corresponding to a single algorithm, second algorithm 124b may have been formed by assembling multiple algorithms, each configured to categorize videos 114 into subcategories of a broader category, into a single algorithm 124b. In some embodiments, second algorithm 124b may represent a collection of algorithms that includes an algorithm configured to categorize videos 114 into a set of broad categories, as well as one or more algorithms associated with each broad category and configured to categorize videos 114 into subcategories of the broad category.

Modifications, additions, or omissions may be made to the systems described herein without departing from the scope of the invention. For example, system 100 may include any number of users 104, devices 106, networks 108, and databases 110. The components may be integrated or separated. Moreover, the operations may be performed by more, fewer, or other components. Additionally, the operations may be performed using any suitable logic comprising software, hardware, and/or other logic.

II. Hybrid Model for Video Categorization

FIG. 2 illustrates an example of the process by which video categorization tool 102 uses first algorithm 124a and second algorithm 124b to categorize a video 114, by (1) using first algorithm 124a to categorize individual frames 130 of video 114, and then (2) applying second algorithm 124b to all or a portion of these frame categorizations to categorize video 114.

a. First Algorithm for Video Frame Categorization

As illustrated in FIG. 2 video categorization tool 102 uses first algorithm 124a to categorize individual frames 130 of video 114. Accordingly, in response to receiving a request 126 to categorize a video 114 (or in response to any other determination to categorize video 114), video categorization tool 102 first splits video 114 into a time-ordered series of frames 130. Each frame 130a through 130p is time-ordered within the series of frames 130 according to the time at which the frame is to be displayed during playback of video 114.

In certain embodiments, the time-ordered series of frames 130 includes all frames 130a through 130p present in video 114. In some embodiments, the time-ordered series of frames 130 include a subset of the frames of video 114. For example, in certain embodiments, frames 130a through 130p, which are used to form the time-ordered series of frames 130, are chosen at regular intervals from video 114. As a specific example, every n-th frame 130 of video 114 may be selected for the time-ordered series of frames 130, where n is any number smaller than the total number of frames 130 included in video 114. For example, n may be 2, 5, 10, 20, 50, 100, or any other suitable number. Selecting every n-th frame 130 of video 114, as opposed to using every frame 130 of video 114, may be desirable to reduce the processing time of the video categorization method.

As another example, in certain embodiments, time-ordered series of frames 130 includes a subset of the frames of video 114 as a result of a pre-processing performed by data categorization tool 102. For example, prior to generating time-ordered series of frames 130, data categorization tool 102 may determine whether each frame 130a through 130p is appropriate for use in the categorization process. Data categorization tool 102 may discard a frame 130a if the tool determines that the frame is underexposed, overexposed, blurry, and/or otherwise poorly suited for use in the video categorization process. As a specific example, data categorization tool 102 may determine that frame 130a is overexposed by determining that an average brightness value for the pixels forming frame 130a is above a threshold. As another specific example, data categorization tool 102 may determine that frame 130a is underexposed by determining that an average brightness value for the pixels forming frame 130a is below a threshold. As another specific example, data categorization tool 102 may determine that frame 130a is blurry by applying an edge-detection algorithm and determining that the variance of the pixels forming frame 130a, across the detected edges, is less than a threshold. As a further specific example, data categorization tool 102 may determine that frame 130a is blurry by applying a Fourier transform to the pixels forming frame 130a and determining that the result does not include frequencies higher than a specific value.

After generating time-ordered series of frames 130 from video 114, data categorization tool 102 next uses first algorithm 124a to assign each frame 130a through 130p to an object category 120 of the set of object categories 120a through 120m. First algorithm 124a assigns a frame 130 of a video 114 to a specific object category 120 by determining that the frame 130 depicts an image of an object belonging to the specific object category 120. First algorithm 124a may determine that frame 130 depicts an image of an object belonging to the specific object category 120 in any suitable manner. For example, in certain embodiments and as described above, first algorithm 124a is any algorithm capable of assigning a frame 130a to an object category 120a by determining that the probability that frame 130a includes an image of an object of object category 120a is greater than the probabilities that frame 130a includes images of objects belonging to any of the other object categories 120b through 120m. For example, in certain embodiments, first algorithm 124a is a convolutional neural network.

In response to assigning frame 130a to object category 120a, first algorithm 124a generates object category assignment 204a. Object category assignment 204a corresponds to any information indicating that first algorithm 124a has assigned frame 130a to object category 120a. Data categorization tool 102 uses first algorithm 124a to generate a time-ordered series of object category assignments 204, where each included object category assignment 204a through 204n corresponds to a frame 130a through 130p of the time-ordered series of frames 130. Each object category assignment 204a through 204n is ordered within the time-ordered series of object category assignments 204 according to the ordering of its corresponding frame 130a through 130p within the time-ordered series of frames 130.

b. Frame Category Filter

In certain embodiments, data categorization tool 102 uses the entire time-ordered series of object category assignments 204 to assign video 114 to motion category 122. In some embodiments, data categorization tool 102 uses a subset of time-ordered series of object category assignments 204. As an example, in certain embodiments, data categorization tool 102 applies category filter 206 to time-ordered series of object category assignments 204, prior to implementing second algorithm 124b. Category filter 206 is any filter designed to reduce the number of object category assignments 204a through 204n stored in time-ordered series of object category assignments 204. For example, in certain embodiments, category filter 206 is configured to remove redundant object category assignments 204. For instance, consider an example in which time-ordered series of object category assignments 204 includes the following object category assignments: (object category 120b, object category 120b, object category 120d, object category 120d, object category 120d). Category filter 206 may consider the first object category assignment 204a of this series (object category 120b) and determine that it is the same as the second object category assignment 204b of the series. Accordingly, category filter 206 may remove first object category assignment 204a from the series. Similarly, category filter 206 may determine that the third object category assignment 204c of this series (object category 120d) is the same as the fourth object category assignment 204d, and the fourth object category assignment 204d is the same as the fifth object category assignment. Accordingly, category filter 206 may remove third object category assignment 204c and fourth object category assignment 204d from the series, leaving filtered series 208, which includes the following object category assignments: (object category 120b, object category 120d). Applying category filter 206 in this manner may be desirable, where, for example, second algorithm 124b is a recurrent neural network. This is because recurrent neural networks are known to suffer from a lack of long-term memory, such that inputs processed early in the learning process are often weighted less than those that are processed later. Accordingly, removing redundant object category assignments 204 may help ensure that all relevant object category assignments 204 receive adequate weighting during the learning process of recurrent neural network 124b.

c. Second Algorithm for Video Categorization Based on the Identified Frame Categories After using first algorithm 124a to generate time-ordered series of object category assignments 204 and optionally applying category filter 206 to time-ordered series of object category assignments 204 to generate filtered series 208, data categorization tool 102 next uses second algorithm 124a to assign time-ordered series of object category assignments 204 (or optionally filtered series 208) to a motion category 122 of the set of motion categories 122a through 122n. Second algorithm 124b assigns the time-ordered series of object category assignments 204 (or optionally filtered series 208) to a specific motion category 122 by determining, based on series 204 or 208, that video 114 depicts a motion of the specific motion category 122. Second algorithm 124b may determine that video 114 depicts a motion of the specific motion category 122 in any suitable manner. For example, in certain embodiments and as described above, second algorithm 124b is any algorithm capable of assigning an ordered series of object category assignments 204 or 208 to a motion category 122a by determining that the probability that video 114, used to generate series 204/208, depicts a motion of motion category 122a is greater than the probabilities that video 114 depicts motions belonging to any of the other motion categories 122b through 122n. For example, in certain embodiments, second algorithm 124b is a recurrent neural network.

In certain embodiments, the processes illustrated in FIG. 2 may be repeated any number of times. As an example, in certain embodiments, first algorithm 124a may represent a collection of algorithms that includes an algorithm configured to categorize frames 130 into a set of broad object categories 120, as well as one or more algorithms configured to categorize frames 130 into narrow object categories 120 (for example, subcategories of the broad category 120). Similarly, second algorithm 124b may represent a collection of algorithms that includes an algorithm configured to categorize series of object category assignments 204/208 into a set of broad motion categories 122, as well as one or more algorithms associated with each broad category 122 and configured to categories series of object category assignments 204/208 into subcategories of the broad category 122. In such embodiments, the process illustrated in FIG. 2 may be performed a first time using a first version of first algorithm 124a configured to categorize each frame 130a through 130p into a broad object category of object categories 120a through 120m and a first version of second algorithm 124b configured to categorize the resulting series of object category assignments 204/208 into a broad motion category of motion categories 122a through 122n. The process illustrated in FIG. 2 may then be repeated, using a second version of first algorithm 124a configured to categorize each frame 130a through 130p into a narrow object category of object categories 120a through 120m and a second version of second algorithm 124b configured to categorize the resulting series of object category assignments 204/208 into a narrow motion category of motion categories 122a through 122n, where video categorization tool 102 selects the second version of first algorithm 124a and the second version of second algorithm 124b based on the broad motion category of motion categories 122a through 122n first identified. For example, consider a video 114 that depicts a triathlon. Video categorization tool 102 may use a broad first version of first algorithm 124a and a broad first version of second algorithm 124b to categorize video 114 into the broad category of "sports." Video categorization tool 102 may then use this broad category to select a second version of first algorithm 124a capable of categorizing each frame 130a through 130p into a subcategory of the broader "sports" category, and then implement this second version of first algorithm 124a. For instance, video categorization tool 102 may implement second version of first algorithm 124a to categorize the frames 130 of video 114 into the subcategories 120 of "swimming," "running," and "cycling." Video categorization tool 102 may also use the broad category 122 to select a second version of second algorithm 124b capable of categorizing the series of narrower object category assignments 204/208 into a subcategory of the broader "sports" category, and then implement this second version of second algorithm 124b. For instance, video categorization tool 102 may implement second version of second algorithm 124b to categorize the ordered series of object category assignments 204/208, which includes the object categories 120 of "swimming," "running," and "cycling," into the subcategory 122 labeled "triathlon."

In response to assigning video 114 to motion category 122, video categorization tool 102 may transmit a response 128 that indicates the motion category assignment to user 104. In some embodiments, in response to assigning video 114 to motion category 122, video categorization tool 102 may use motion category 122 to index video 114 in database 110.

III. Method of Categorizing Videos Using a Hybrid Model

FIG. 3 presents a flowchart illustrating an example method 300 by which video categorization tool 102 categorizes a video 114. In step 302 video categorization tool 102 receives video 114. In step 304 video categorization tool 102 splits video 114 into a time-ordered series of frames 130. In step 306 video categorization tool 102 selects first frame 130a from time-ordered series of frames 130. In step 308 video categorization tool 102 applies first algorithm 124a to frame 130a. First algorithm 124a is configured to assign frame 130a to an object category 120 of a set of object categories 120a through 120m. In certain embodiments, first algorithm 124a is a convolutional neural network. In step 310 video categorization tool 102 stores the assigned object category 120 in ordered series of object category assignments 204. In step 312 video categorization tool 102 determines whether any additional frames are present in time-ordered series of frames 130. If, in step 312, video categorization tool 102 determines that additional frames are present in time-ordered series of frames 130, in step 314 video categorization tool 102 selects the next frame in the time-ordered series of frames 130. Method 300 then returns to step 308.

If, in step 312, video categorization tool 102 determines that no additional frames are present in time-ordered series of frames 130, in step 316 video categorization tool 102 applies category filter 206 to the ordered series of object category assignments 204. Category filter 206 may be configured to remove redundant object categories 120 from the ordered series of object category assignments 204. Finally, in step 318 video categorization tool 102 applies second algorithm 124b to the ordered series of object category assignments 204 to assign video 114 to a motion category 122 of the set of motion categories 122a through 122n. In certain embodiments, second algorithm 124b is a recurrent neural network.

Modifications, additions, or omissions may be made to method 300 depicted in FIG. 3. Method 300 may include more, fewer, or other steps. For example, steps may be performed in parallel or in any suitable order. While discussed as video classification tool 102 (or components thereof) performing the steps, any suitable component of system 100, such as device(s) 106 for example, may perform one or more steps of the method.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as falling within the scope of the appended claims.

What is claimed is:

1. An apparatus comprising:
 a memory configured to store:
  a set of object categories, each object category of the set of object categories corresponding to at least one object; and a set of motion categories, each motion category of the set of motion categories corresponding to at least one motion;

a hardware processor communicatively coupled to the memory, the hardware processor configured to:
receive a video;
split the video into an ordered series of frames, each frame of the ordered series of frames corresponding to a time of the frame within the video and ordered within the ordered series of frames according to the time; and
in response to splitting the video into the ordered series of frames:
for each frame of the ordered series of frames:
determine that the frame comprises an image of an object of a given object category of the set of object categories;
assign the given object category to the frame; and
store the assigned object category in an ordered series of object category assignments, the assigned object category ordered within the ordered series of object category assignments according to the time of the frame within the video;
determine, based on at least a subset of the ordered series of object category assignments, that the video used to generate the ordered series of object category assignments depicts a motion of a given motion category of the set of motion categories; and
assign the given motion category to the video.

2. The apparatus of claim 1, wherein:
determining that the frame comprises the image of the object of the given object category comprises:
generating a set of first scores, each score of the set of first scores corresponding to an object category of the set of object categories and representing a probability that the frame comprises an image of an object of the object category; and
identifying from the set of first scores a largest score, wherein the largest score corresponds to the given object category; and
determining that the video used to generate the ordered series of object category assignments depicts the motion of the given motion category comprises:
generating, based on at least the subset of the ordered series of object category assignments, a set of second scores, each score of the set of second scores corresponding to a motion category of the set of motion categories and representing a probability that the video used to generate the ordered series of object category assignments depicts a motion of the motion category; and
identifying from the set of second scores a largest score, wherein the largest score corresponds to the given motion category.

3. The apparatus of claim 2, wherein generating, for each frame, the set of first scores comprises applying a convolutional neural network to input generated from pixels of the frame.

4. The apparatus of claim 2, wherein generating the set of second scores comprises applying a recurrent neural network to input comprising at least the subset of the ordered series of object category assignments.

5. The apparatus of claim 4, wherein:
the video is associated with a known motion category; and
in response to assigning the given motion category to the video, the hardware processor is further configured to:
compare the assigned motion category to the known motion category;
determine that the assigned motion category and the known motion category do not match; and
in response to determining that the assigned motion category and the known motion category do not match, use the subset of the ordered series of object category assignments and the known motion category to update the recurrent neural network.

6. The apparatus of claim 1, wherein:
the first video comprises a first number of frames; and
the ordered series of frames comprises a second number of frames, the first number of frames greater than the second number of frames.

7. The apparatus of claim 1, wherein the hardware processor is further configured to generate the subset of the ordered series of object category assignments from the ordered series of object category assignments such that, for each object category assignment of the subset of the ordered series of object category assignments, the object category assignment is different from an immediately subsequent object category assignment in the subset of the ordered series of object category assignments.

8. A method comprising:
receiving a video;
splitting the video into an ordered series of frames, each frame of the ordered series of frames corresponding to a time of the frame within the video and ordered within the ordered series of frames according to the time; and
in response to splitting the video into the ordered series of frames:
for each frame of the ordered series of frames:
determining that the frame comprises an image of an object of a given object category of a set of object categories, wherein each object category of the set of object categories corresponds to at least one object;
assigning the given object category to the frame; and
storing the assigned object category in an ordered series of object category assignments, the assigned object category ordered within the ordered series of object category assignments according to the time of the frame within the video;
determining, based on at least a subset of the ordered series of object category assignments, that the video used to generate the ordered series of object category assignments depicts a motion of a given motion category of a set of motion categories, wherein each motion category of the set of motion categories corresponds to at least one motion; and
assigning the given motion category to the video.

9. The method of claim 8, wherein:
determining that the frame comprises the image of the object of the given object category comprises:
generating a set of first scores, each score of the set of first scores corresponding to an object category of the set of object categories and representing a probability that the frame comprises an image of an object of the object category; and
identifying from the set of first scores a largest score, wherein the largest score corresponds to the given object category; and
determining that the video used to generate the ordered series of object category assignments depicts the motion of the given motion category comprises:

generating, based on at least the subset of the ordered series of object category assignments, a set of second scores, each score of the set of second scores corresponding to a motion category of the set of motion categories and representing a probability that the video used to generate the ordered series of object category assignments depicts a motion of the motion category; and identifying from the set of second scores a largest score, wherein the largest score corresponds to the given motion category.

10. The method of claim 9, wherein generating, for each frame, the set of first scores comprises applying a convolutional neural network to input generated from pixels of the frame.

11. The method of claim 9, wherein generating the set of second scores comprises applying a recurrent neural network to input comprising at least the subset of the ordered series of object category assignments.

12. The method of claim 11, wherein:
the video is associated with a known motion category; and
in response to assigning the given motion category to the video, the method further comprises:
comparing the assigned motion category to the known motion category;
determining that the assigned motion category and the known motion category do not match; and
in response to determining that the assigned motion category and the known motion category do not match, using the subset of the ordered series of object category assignments and the known motion category to update the recurrent neural network.

13. The method of claim 8, wherein:
the first video comprises a first number of frames; and
the ordered series of frames comprises a second number of frames, the first number of frames greater than the second number of frames.

14. The method of claim 8, further comprising generating the subset of the ordered series of object category assignments from the ordered series of object category assignments such that, for each object category assignment of the subset of the ordered series of object category assignments, the object category assignment is different from an immediately subsequent object category assignment in the subset of the ordered series of object category assignments.

15. A computer program comprising executable instructions stored in a non-transitory computer-readable medium that when executed by a hardware processor causes the hardware processor to:
receive a video;
split the video into an ordered series of frames, each frame of the ordered series of frames corresponding to a time of the frame within the video and ordered within the ordered series of frames according to the time; and
in response to splitting the video into the ordered series of frames:
for each frame of the ordered series of frames:
determine that the frame comprises an image of an object of a given object category of the set of object categories, wherein each object category of the set of object categories corresponds to at least one object;
assign the given object category to the frame; and
store the assigned object category in an ordered series of object category assignments, the assigned object category ordered within the ordered series of object category assignments according to the time of the frame within the video;
determine, based on at least a subset of the ordered series of object category assignments, that the video used to generate the ordered series of object category assignments depicts a motion of a given motion category of the set of motion categories, wherein each motion category of the set of motion categories corresponds to at least one motion; and
assign the given motion category to the video.

16. The computer program of claim 15, wherein:
determining that the frame comprises the image of the object of the given object category comprises:
generating a set of first scores, each score of the set of first scores corresponding to an object category of the set of object categories and representing a probability that the frame comprises an image of an object of the object category; and
identifying from the set of first scores a largest score, wherein the largest score corresponds to the given object category; and
determining that the video used to generate the ordered series of object category assignments depicts the motion of the given motion category comprises:
generating, based on at least the subset of the ordered series of object category assignments, a set of second scores, each score of the set of second scores corresponding to a motion category of the set of motion categories and representing a probability that the video used to generate the ordered series of object category assignments depicts a motion of the motion category; and
identifying from the set of second scores a largest score, wherein the largest score corresponds to the given motion category.

17. The computer program of claim 16, wherein generating the set of second scores comprises applying a recurrent neural network to input comprising at least the subset of the ordered series of object category assignments.

18. The computer program of claim 17, wherein:
the video is associated with a known motion category; and
when executed by the hardware processor the computer program further causes the hardware processor, in response to assigning the given motion category to the video, to:
compare the assigned motion category to the known motion category;
determine that the assigned motion category and the known motion category do not match; and
in response to determining that the assigned motion category and the known motion category do not match, use the subset of the ordered series of object category assignments and the known motion category to update the recurrent neural network.

19. The computer program of claim 15, wherein:
the first video comprises a first number of frames; and
the ordered series of frames comprises a second number of frames, the first number of frames greater than the second number of frames.

20. The computer program of claim 15, wherein when executed by the hardware processor the computer program further causes the hardware processor to generate the subset of the ordered series of object category assignments from the ordered series of object category assignments such that, for each object category assignment of the subset of the ordered series of object category assignments, the object category assignment is different from an immediately subsequent object category assignment in the subset of the ordered series of object category assignments.

\* \* \* \* \*